United States Patent
Matsuzaki et al.

(10) Patent No.: US 6,734,426 B2
(45) Date of Patent: May 11, 2004

(54) PROBE SCANNING DEVICE

(75) Inventors: Ryuichi Matsuzaki, Chiba (JP); Akihiko Honma, Chiba (JP); Yukihiro Sato, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 0 days.

(21) Appl. No.: 10/167,538

(22) Filed: Jun. 12, 2002

(65) Prior Publication Data

US 2003/0010928 A1 Jan. 16, 2003

(30) Foreign Application Priority Data

Jun. 15, 2001 (JP) ...................... 2001-182435
Jun. 19, 2001 (JP) ...................... 2001-184691
May 8, 2002 (JP) ...................... 2002-133041

(51) Int. Cl.$^7$ ............................................ H01J 37/00
(52) U.S. Cl. .................................. 250/306; 250/433.1
(58) Field of Search .......................... 250/306, 307, 250/443.1

(56) References Cited

U.S. PATENT DOCUMENTS

| | | | | | |
|---|---|---|---|---|---|
| 5,506,400 | A | * | 4/1996 | Honma et al. | 250/205 |
| 5,834,644 | A | * | 11/1998 | Shao et al. | 73/105 |
| 5,965,885 | A | * | 10/1999 | Inoue | 250/306 |
| 6,017,590 | A | * | 1/2000 | Lindsay et al. | 427/430.1 |
| 6,051,833 | A | * | 4/2000 | Yasutake | 250/306 |
| 6,459,088 | B1 | * | 10/2002 | Yasuda et al. | 250/442.11 |
| 6,499,340 | B1 | * | 12/2002 | Yasutake et al. | 250/306 |

FOREIGN PATENT DOCUMENTS

JP 08184600 A * 7/1996 .......... G01N/37/00
JP 2002022636 A * 1/2002 .......... G01N/13/10

OTHER PUBLICATIONS

JP 2000346778A assignee: SEIKO INSTR INC. Probe scanner for probe scanning microscope, controls temperature of viscoelastic medium during retract motion of probe from specimen to become higher than that during approach motion of probe towards specimen.*

* cited by examiner

*Primary Examiner*—John H. Lee
*Assistant Examiner*—Johnnie L Smith, II
(74) *Attorney, Agent, or Firm*—Adams & Wilks (57) ABSTRACT

A probe scanning device has a first tubular member extending in a z direction. A second tubular member has a rear end portion extending into the first tubular member to define a space between an inner peripheral surface portion of the first tubular member and an outer peripheral surface portion of the second tubular member. A probe tip is mounted on a front end portion of the second tubular member. A viscous material is disposed in the space between the first tubular member and the second tubular member. A moving mechanism reciprocally moves the first tubular member in an xy direction, and a voice coil motor drives the second tubular member towards the first tubular member in the z direction. A drive mechanism has a coarse adjustment mode for coarsely moving the probe tip toward a surface of a sample and a measurement mode for fine movement of the probe tip in the z direction to maintain a given relationship between relative positions of the probe tip and the sample surface after coarse movement. A connecting mechanism selectively integrally connects the first tubular member and the second tubular member to one another.

26 Claims, 10 Drawing Sheets

PRIOR ART

FIG.10

PROBE SCANNING DEVICE

BACKGROUND OF THE INVENTION

1. Field of the Invention

The present invention relates to a probe scanning device such as a scanning probe microscope, and particularly relates to a probe scanning device capable of measurement with little temperature drift and low noise.

2. Description of the Related Art

Figure 10:
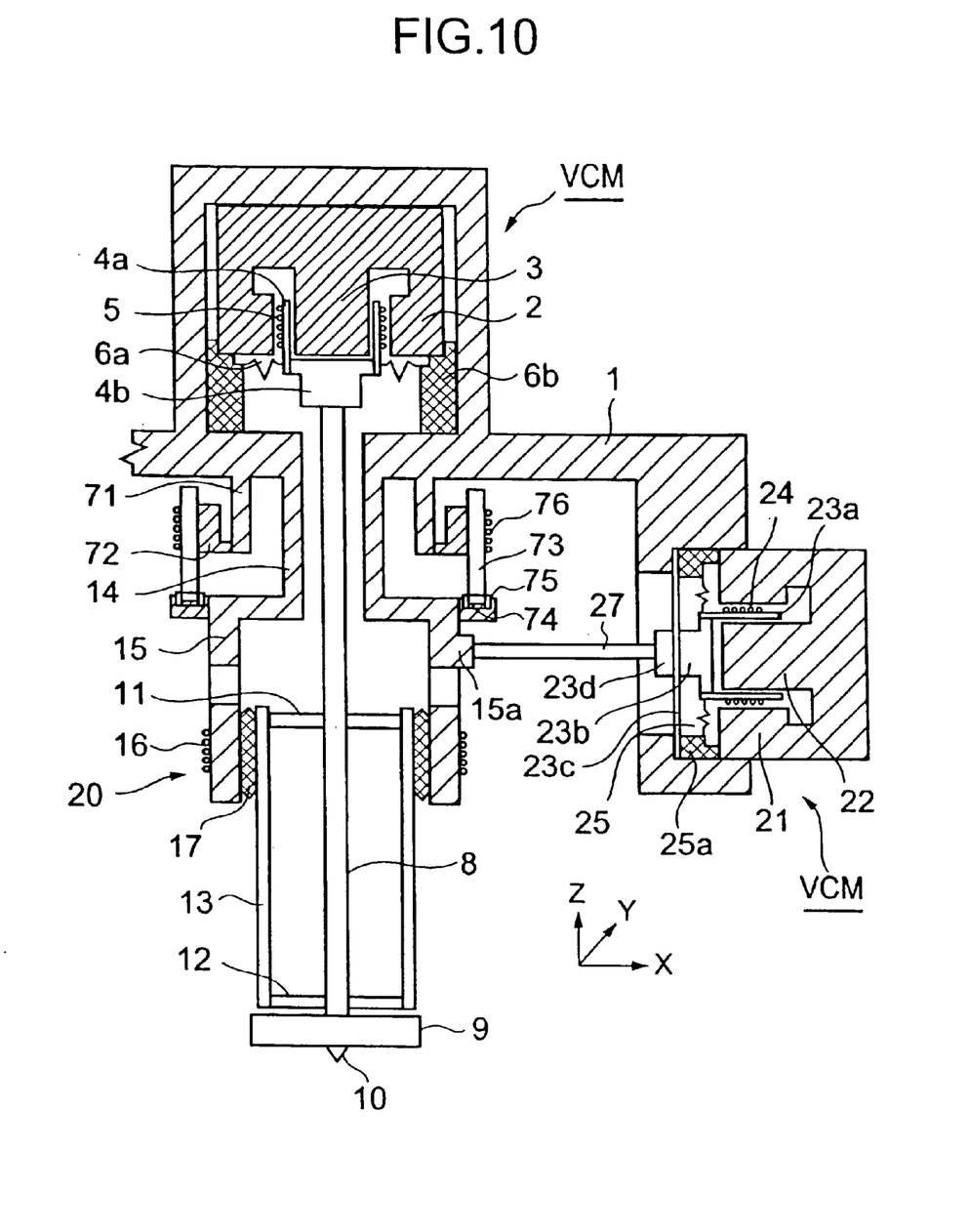
FIG. 10 is a sectional view showing the structure of the primary part of the probe scanning device having a conventional zooming mechanism.

The applicant has previously invented a probe scanning device having a zooming function shown in FIG. 10 and applied for a patent (Japanese Patent Publication No. Hei. 10-221348). The structure and function of this probe scanning device will be briefly described below.

A case 1 has a scanning tube 20 having a thin tube 14 projecting to a sample chamber and a thick tube 15 connected thereto as main components. An inner tube 13 is supported inside the thick tube 15 through the viscous material 17. The thick tube 15, the inner tube 13, and the thin tube 14 are made with the same quality and heat conductivity and the thermal expansion coefficients thereof are substantially equal. A lower melting-point metal holder 74 is fixed to an outer side face of the thick tube 15. The low melting-point metal holder 74 consists of an insulating material such as ceramic or a super-engineered plastic and a low melting-point metal 75 such as u alloy is insulatively housed in a groove formed on a top face thereof.

A first voice coil motor (VCM) is fitted to the top of the case 1.

This first voice coil motor comprises a magnet 2 having a shaft 3, a needle 4a surrounded by a wound on coil 5, a needle component 4b fixed to the needle 4a, a membrane 6a, and a fixing component 6b fixing an outer circumference of the membrane 6a. A spindle 8 extending in a z direction is fixed to the needle component 4b. A detector 9 for detecting a displacement of a tip 10 is installed in a bottom side end of this spindle 8.

The spindle 8 is supported elastically by first and a second springs 11 and 12 held by the inner tube 13. A heating coil 16 is wound around at a position outside the thick tube 15 and opposite to the viscous material 17. The heating coil 16 is electrified for softening the viscous material 17 in coarse adjustment of the tip 10 in the z direction.

A second voice coil motor, which comprises a magnet 21 having a shaft 22, a needle 23a surrounded by a wound on coil 24, a needle component 23b fixed to the needle 23a, a membrane 25, and a fixing component 25a fixing the outer circumference of the membrane 25, is mounted on a side of the case 1.

A thin annular plate spring 23c is fitted to a lateral side of the case 1 for preventing the needle 23a from making contact with the shaft 22 or the magnet 21, when the thick tube of the scanning tube 20 tilts in an XY direction. At the thin annular plate spring 23c, the outer circumference thereof is pushed by the case 1 and the membrane fixing component 25a and an inner circumference thereof is pushed by the needle component 23b and an annular spring component 23d. A spindle 27 extending in an x direction is fitted to the needle component 23b and the annular spring component 23d. An open end of the spindle 27 is fixed to a projecting portion 15a of the thick tube 15.

A third voice coil motor (not shown) is installed in a direction differing by 90° from the second voice coil motor. The third voice coil motor is constituted as being identical or equal to the second voice coil motor. A y direction (a direction at right angles to the paper) spindle connects a movable component fixed to the needle of the third voice coil motor to the thick tube 15. Driving the second and third voice coil motors allows the tip 10 to scan in the xy direction. A sample table (not shown) is mounted at a position opposite the tip 10 and a sample is mounted on the sample table.

An outer tube 71, of which one end is fixed to the case 1, extends to the outside of the thin tube 14 in the direction coaxial with the thin tube 14 and so as to project to the sample chamber. At the outer circumference of a front end of the outer tube 71, a heat conductive cylinder 73 is installed through the insulative member 72 formed from ceramic material. A heating coil 76 is wound around the outer circumference of the heat conductive cylinder 73. The bottom end of the heat conductive cylinder 73 is embedded in the low melting-point metal 75 of the low melting-point metal holder 74.

According to such a structure, controlling electrification of the heating coil 76 for melting or solidifying the low melting-point metal 75 allows switching spring rigidity of the scanning tube 20 to any one of spring rigidity of the thin tube 14 only or spring rigidity created by adding the thin tube 14 to the outer tube 71. As a result, even if the driving current supplied to the voice coil motors is equal, a movable range of the scanning tube 20 in the XY direction can be made to be different to express the zooming function.

When measuring the sample, first, the heating coil 16 of the thick tube is electrified to raise the temperature of the viscous material 17 so as to finally decrease the viscosity of the viscous material 17. Next, the voice coil motor is electrified in a z direction to carry out coarse adjustment of the spindle 8 in the z direction. When the tip 10 makes contact with the sample surface and then an extent of bending reaches a predetermined value, electrification of the voice coil motor is suppressed and moving down of the tip 10 is stopped. At this time, coarse adjustment is completed.

Subsequently, electrification of the heating coil 16 is suppressed to drop the temperature of the viscous material 17 to a preheated temperature. As a result, viscosity of the viscous material 17 increases resulting in the thick tube 15 with the inner tube 13 becoming substantially integral due to the viscosity of the viscous material 17 and the sample therefore becomes measurable.

In the probe scanning device according to the structure as described above, a surface shape of the sample can be accurately measured preferably by lowering a scanning speed of the tip 10 in the xy direction. A resonance frequency of a z axis is a function of a resultant force of a first 11 and a second 12 spring and a mass of the movable portion on the z axis, and thus, if frequency components, when a change of the z axis is subjected to frequency resolution making the scanning speed of the x axis and the y axis to a time axis, contains the resonance frequency of the z axis, increased amplitude is observed in this component. Such resonance can be prevented by lowering the scanning speed in the xy direction.

However, when the scanning speed is decreased, time for measurement necessarily increases.

The viscous material 17 has a small viscosity at preheating temperatures and the inner tube 13 moves down or up slightly against the thick tube 15. Therefore, when measurement time becomes longer, a distance of the inner tube 13 which is moved down or up increases which causes data related to the z direction to contain an error corresponding to the distance made by moving down or up.

When electrification of the heating coil 16 during measurement is limited, the temperature of individual parts containing the thick tube 15 and the inner tube 13 decreases gradually causing thermal shrinkage and data relating to the z direction therefore contains an error corresponding to thermal shrinkage.

SUMMARY OF THE INVENTION

The advantage of the present invention is to provide a probe scanning device capable of measurement of high precision and low noise even when measuring at slow scanning speeds.

The present invention is characterized by a probe scanning device having a thick tube extended in a z direction and an end thereof supported by a case, an inner tube passing through the inside of the thick tube, a tip mounted on the front end of the inner tube, a viscous material filled in a space between the thick tube and the inner tube, first heating means for heating the thick tube, scanning means for reciprocally moving the thick tube in an xy direction, a voice coil motor for driving the inner tube towards the thick tube in the z direction, first temperature-controlling means for decreasing viscosity of the viscous material by supplying a driving current to the first heating means, and driving means having a coarse adjustment mode for coarsely moving the tip to a surface of a sample and a measurement mode for fine movement of the tip in the z direction to maintain a given relationship between relative positions of the tip and the sample surface after coarse movement, wherein fixing means for selectively fixing the thick tube and the inner tube are also provided.

(1) The probe scanning device has a fixing means for selectively fixing the thick tube and the inner tube.

(2) The probe scanning device is characterized in that the fixing means comprises: a low melting-point metal holder fixed to the inner tube and insulatively housing a low melting-point metal, a heat conductive member fixed to the thick tube through an insulant and with an end thereof being positioned so as to be embedded in the low melting-point metal, second heating means for heating the heat conductive member, second temperature-controlling means for controlling the supply of driving current to the second heating means in order to allow a temperature of the heat conductive member to rise to a first temperature, at which the low melting-point metal softens during coarse adjustment, and drop to a second temperature, at which the low melting-point metal hardens during measurement.

(3) There is also provided means for detecting an offset current contained in a driving current of the voice coil motor, wherein the first temperature-controlling means controls a driving current to be supplied to the first heating means to raise the temperature of the thick tube to a temperature, at which viscosity of the viscous material drops during coarse adjustment, and allows the temperature, at which the offset current is reduced in the measurement, to be reached.

(4) The probe scanning device is characterized in that each temperature-controlling means comprises holding means for holding a driving signal, which is supplied to each heating means, during measurement.

According to the characteristic (1) as described above, the thick tube and the inner tube are firmly fixed by the solidification of the low melting-point metal and a positioning shift with respect to time can therefore be prevented.

According to the characteristic (2) as described above, the temperature of the heat conductive cylinder is lowered to a temperature at which the low melting-point metal is solidified, and heat shrinkage of the heat conductive cylinder in the z direction can be cancelled by thermal expansion of the thick tube and the inner tube.

According to the characteristic (3) as described above, the temperature drift caused by a temperature change during measurement can be eliminated not by supplying the offset current to the voice coil motor, but rather by thermal expansion or heat shrinkage of the thick tube and the inner tube.

According to the characteristic (4) as described above, an output signal from a first and second temperature-controlling unit are held during measurement and hence, regardless of the change of an ambient temperature and temperature drift in a controlling system, an image with less noise can be obtained.

DETAILED DESCRIPTION OF THE PREFERRED EMBODIMENTS

Figure 1:
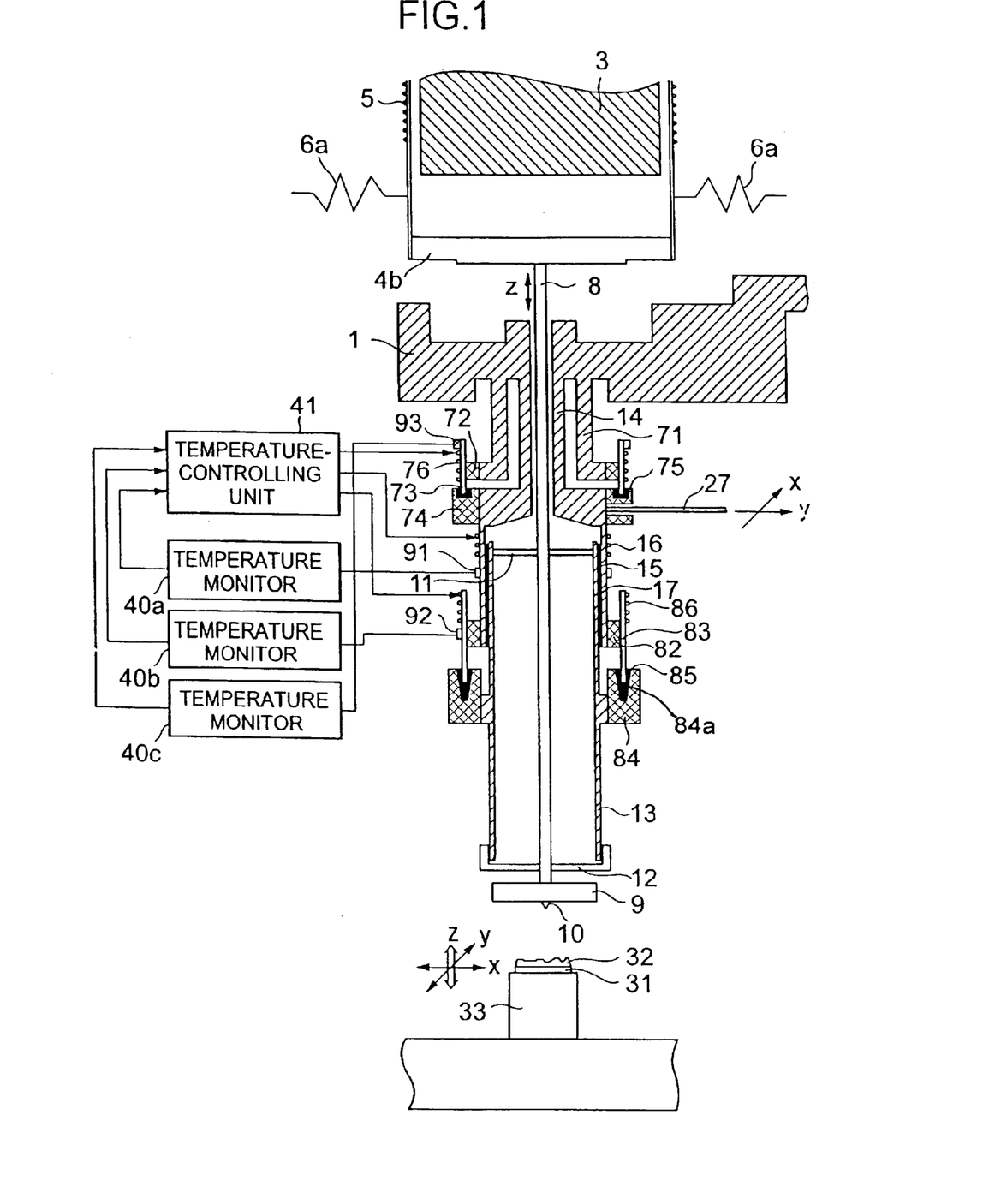
FIG. 1 is a sectional view showing a structure of a primary part of the first embodiment of the probe scanning device of the present invention.

The present invention will be described in detail as follows with reference to the drawings. FIG. 1 is a sectional view showing a structure of a primary part of a first embodiment of the probe scanning device fabricated by applying the present invention, and with the same numerals as above indicating the same portions.

The present embodiment is constituted by materials such as super-invar (31% Ni-5% Co—Fe) having a very small thermal expansion coefficient. A heating coil 16 is wound around the outer circumference of a thick tube 15, and a temperature sensor 91 is installed to measure its temperature. A cylindrical heat conductive cylinder 83 is fixed to a front end of the thick tube 15 through an insulative member 82 such as ceramic or a super-engineered plastic. A heating coil 86 is wound around the outer circumference of the heat conductive cylinder 83 and a temperature sensor 92 is installed to measure its temperature. An annular low melting-point metal holder 84 is fixed to the outer circumference of the inner tube 13. The low melting-point metal holder 84 consists of an insulating material such as ceramic or a super-engineered plastic, and a low melting-point metal 85 such as u alloy insulatively housed in a recess or groove 84*a* formed on the top face of the low melting-point metal holder 84. As shown on in FIG. 1, the thick tube 15 is in the form of a first tubular member and the inner tube 13 is in the form of a second tubular member having a portion extending into the first tubular member.

In the outer circumference of the front end of the outer tube 71, the heat conductive cylinder 73 is installed through the insulative member 72 formed from ceramic material. A heating coil 76 is wound around the outer circumference of the heat conductive cylinder 73, and a temperature sensor 93 is installed to measure its temperature.

The heat conductive cylinder 83, the low melting-point metal 85, and its holder 84 function as connecting or fixing means for integrally connecting or fixing the thick tube 15 to the inner tube 13 during measurement. The heat conductive cylinder 83 and the low melting-point metal holder 84 are positioned to embed the front end of the heat conductive cylinder 83 in the low melting-point metal 85 within a range of coarse adjustment of the inner tube 13.

The sample table 31 is mounted at a position opposite to the tip 10 and the sample 32 is mounted on this sample table 31. The sample table 31 is mounted on a coarse adjustment x,y,z stage 33.

Output signals of individual temperature sensors 91, 92, and 93 are inputted into temperature monitors 40*a*, 40*b*, and 40*c*, respectively. Individual temperature monitors calculate temperatures of individual units based on the output signals of individual temperature sensors for reporting a result of operation to a temperature-controlling unit 41.

The temperature-controlling unit 41 controls a driving current to be supplied to individual heating coils 16, 86, and 76 for maintaining the temperature of individual units to a predetermined temperature.

In a probe scanning device of such a structure, the heating coils 16 of the thick tube 15 are first electrified for raising the temperature of the viscous material 17 to cause a decrease in its viscosity. Thereafter, to maintain the predetermined viscosity of the viscous material 17, electrification of the heating coils 16 is controlled by the temperature-controlling unit 41 based on the output signal of the temperature sensor 91.

Next, the heating coil 86 is electrified for raising the temperature of the heat conductive cylinder 83 to melt the low melting-point metal 85. In this way, fixing state of the thick tube 15 to the inner tube 13 is released.

Next, the voice coil motor in a z direction is electrified to carry out coarse adjustment of the spindle 8 in the z direction. The inner tube 13 moves down to the sample at a predetermined speed and the tip 10 arranged in its front end approaches a surface of the sample. When the tip 10 makes contact with the sample surface and then an extent of bending reaches a predetermined value, electrification of the voice coil motor is suppressed and moving down of the tip 10 is stopped. At this time, coarse adjustment is completed.

Then, electrification of the heating coil 86 is suppressed to cause temperature of the heat conductive cylinder 83 to fall to cause solidification of the low melting-point metal 85. In this way, the thick tube 15 and the inner tube 13 are firmly fixed resulting in substantial integration of both the tubes.

Following this step, when the voice coil motor in a z direction is subjected to fine adjustment to keep a distance to a constant between the tip 10 and the sample surface for scanning the tip 10 in the xy direction, the driving current of the voice coil motor can express a shape of the sample surface. During this step, in this embodiment, the inner tube 13 causes no positioning shift against the thick tube 15, and therefore, even in the case where the scanning speed in xy direction is low and requires a long time for measurement, high precision measurement becomes possible.

Meanwhile, during a measurement term as described above in this embodiment, the individual temperature monitors 40 always monitor the temperature of individual units for ordinary control of electrification of individual heating coils by the temperature-controlling unit 41 to keep individual temperatures to predetermined temperatures, and hence, high precision measurement becomes possible and is not influenced by temperature drift.

In addition, in this embodiment, the case 1 is constituted by a super-invar of a very small thermal expansion coefficient, and effects of temperature drift can be further reduced.

Figure 2:
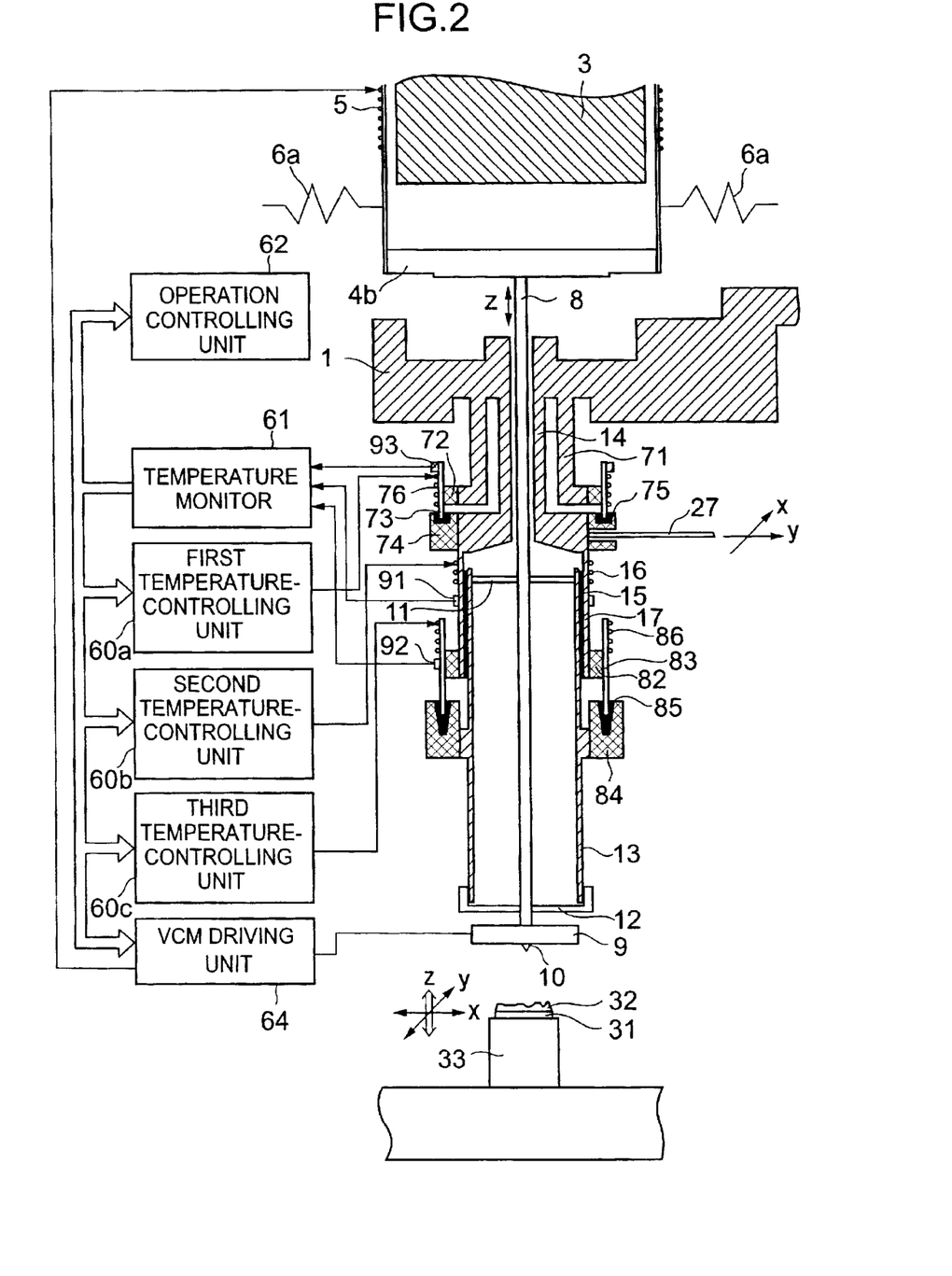
FIG. 2 is a sectional view showing a structure of a primary part of the first embodiment of the probe scanning device of the present invention.

FIG. 2 is a sectional view showing the structure of a main parts of a second embodiment of the probe scanning device fabricated by applying the present invention, and the numerals that are the same as in the above represent the same or similar parts.

According to the first embodiment, after completion of coarse adjustment in the z direction, when electrification of the heating coil 86 is suppressed to cause the temperature of the heat conductive cylinder 83 to fall to fix the thick tube 15 to the inner tube 13, the heat conductive cylinder 83 thermally shrinks so as to pull the tip 10 upward.

At this time, the offset current flows through the voice coil motor in the z direction in order to compensate for a difference in a distance caused by this thermal shrinkage.

The offset current always flowing through the voice coil motor not only causes the observation range of the z direction to narrow, but also causes heat generated by the voice coil motor to increase so as to subject individual units to thermal expansion so that temperature drift occurs in all the directions x, y, and z.

In order to solve such new technical problems, in the second embodiment of the present invention described below, calculation is carried out in advance for the predetermined temperature T4 in order to ensure correspondence of the substantial heat shrinkage (i.e., a pull-up distance of the tip 10) of the heat conductive cylinder 83 in the z direction, when the temperature T83 of the heat conductive cylinder 83 falls with a sum of the substantial thermal expansion (i.e., a pull-down distance of the tip 10) of the thick tube 15 and the inner tube 13 in the z direction, when the temperature of the thick tube 15 is further raised from the temperature for coarse adjustment to the temperature for the predetermined temperature, to cause cancellation of these two values.

During measurement, electrification of the heating coils 16 is controlled to keep the temperature of the thick tube 15 at a predetermined temperature.

In FIG. 2, output signals from the individual temperature sensors 91, 92, and 93 are inputted into the temperature monitor 61. The temperature monitor 61 calculates the temperature of individual units based on the output signal of the individual temperature sensors and supplies the results to the temperature-controlling units 60*a*, 60*b*, and 60*c*. The temperature-controlling unit 60 controls the electrification of individual heating coils 16, 86, and 76 to keep the temperature of individual units at the predetermined temperature.

The VCM driving unit 64 drives the voice coil motor 9 in the z direction based on displacement detected from the tip 10 by a detector 9. An operation controlling unit 62 controls each unit according to an operation mode (the coarse adjustment mode or measurement mode).

Figure 3:
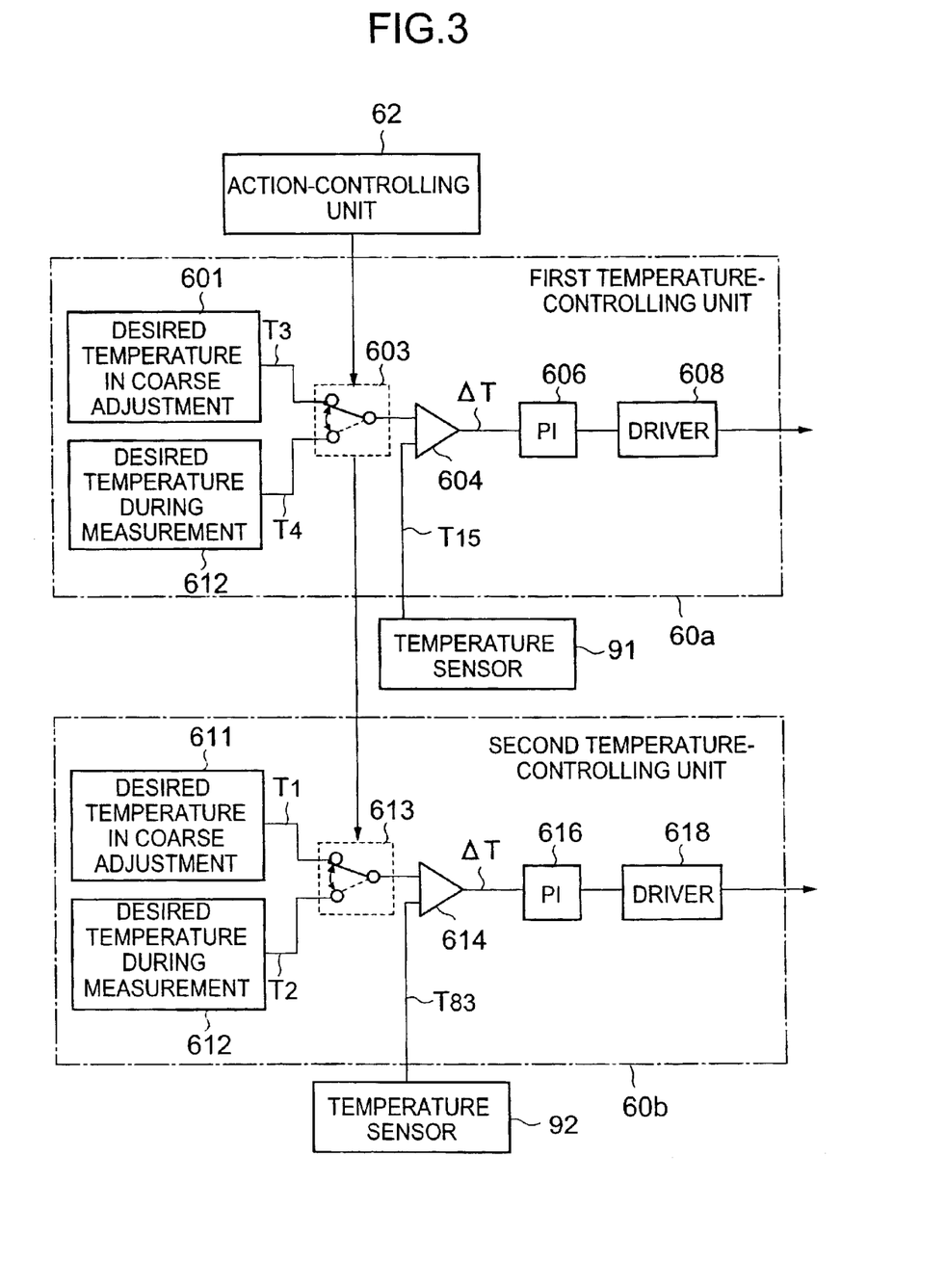
FIG. 3 shows a block diagram representing the structure of a controlling system of the second embodiment.

FIG. 3 is a block diagram showing the structure of the main part of the first and the second temperature-controlling units 60a and 60b, and with the same numerals as above indicating the same or similar portions.

In the desired temperature-setting unit 611 for coarse adjustment in the second temperature-controlling unit 60b, a temperature, higher than a melting point of the low melting-point metal 85 is set as the desired temperature T1 of the heat conductive cylinder 83 in coarse adjustment. For the desired temperature-setting unit 612 for measurement, a temperature lower than a solidifying temperature of the low melting-point metal 85 is set as the desired temperature T2 of the heat conductive cylinder 83 during measurement. However, an excessively low temperature increases heat shrinkage of the heat conductive cylinder 83 during measurement and therefore, in this embodiment, the temperature is set to be 1 to 2 degrees Celsius lower than the solidifying temperature.

A comparing unit 614 compares the desired temperature T1 selected by the change switch 613 with a real temperature T83 detected for the heat conductive cylinder 83 by the temperature sensor 92 for outputting its differential signal $\Delta T$ to a PI controlling unit 616. The PI controlling unit 616 supplies the driving signal to the heating coil 86 through a driver circuit 618 to make the differential signal $\Delta T$ zero.

In the desired temperature-setting unit 601 for coarse adjustment in the first temperature-controlling unit 60a, a temperature allowing sufficient lowering of viscosity of the viscous material 17 is set as the desired temperature T3 of the thick tube 15 during coarse adjustment. The desired temperature T4 of the thick tube 15 during measurement is set at the desired temperature-setting unit 602 for measurement. This desired temperature T4 is set to a value corresponding to the substantial heat shrinkage (i.e., the pull-up distance of the tip 10) of the heat conductive cylinder 83 in the z direction, when the temperature of the heat conductive cylinder 83 is dropped from T1 to T2, with the sum of the substantial thermal expansion (i.e., a pull-down distance of the tip 10) of the thick tube 15 and the inner tube 13 in the z direction, when the temperature of the thick tube 15 is further raised from T3 to T4, to cause cancellation of these two values.

The comparing unit 604 compares the desired temperature T3 or T4 selected by the change switch 603 with the real temperature T15 detected for the thick tube 15 by the temperature sensor 91 for outputting its differential signal $\Delta T$ to the PI controlling unit 606. The PI controlling unit 606 supplies the driving signal to the heating coil 16 through the driver circuit 608 to make the differential signal $\Delta T$ zero.

Figure 4:
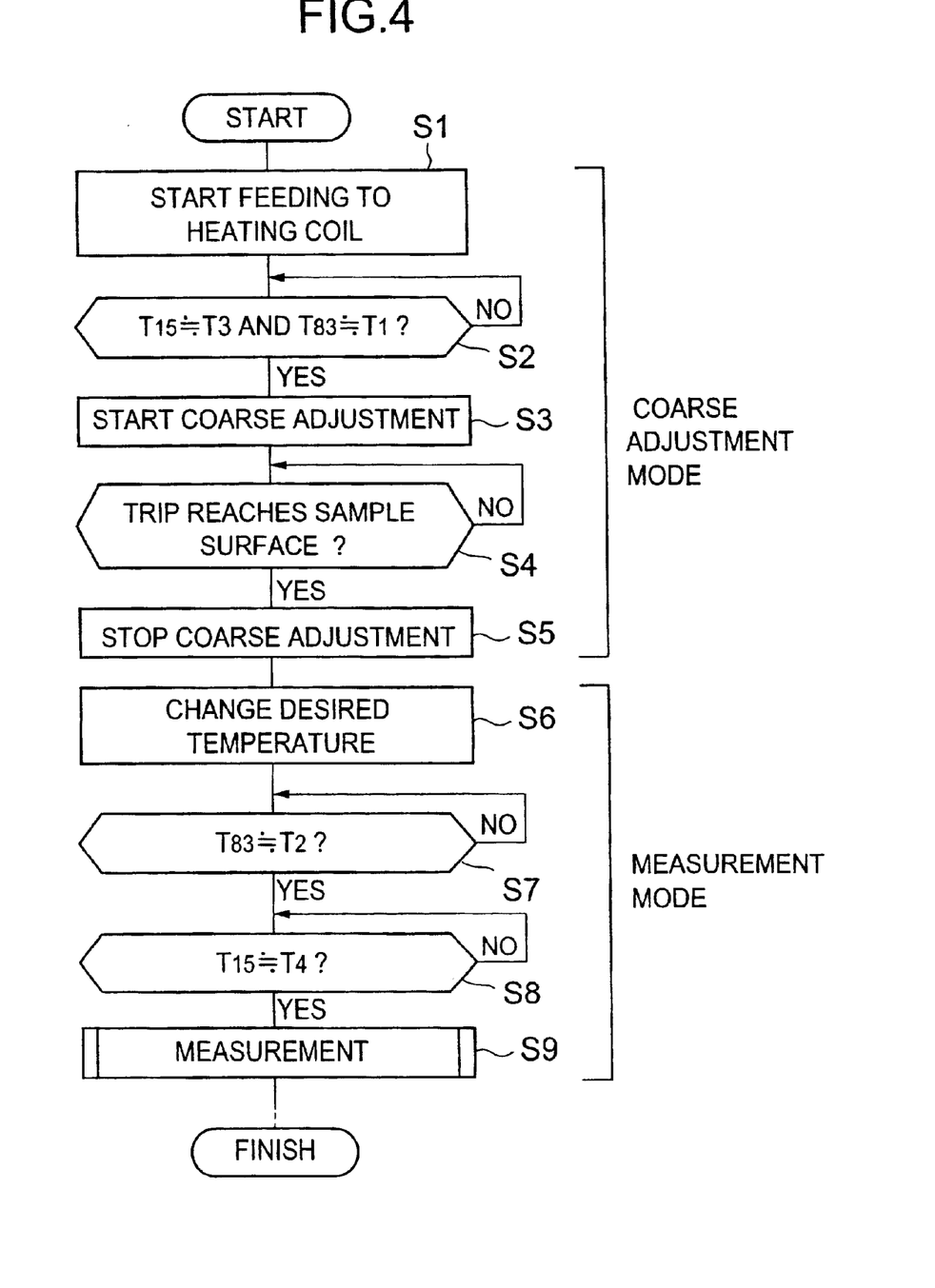
FIG. 4 is a flowchart showing the operation of the second embodiment.

On the other hand, an operation of the present embodiment will be described in detail as follows with reference to a flow chart of FIG. 4.

In an initial state, the operation-controlling unit 62 works in coarse adjustment mode, the desired temperature T3 in coarse adjustment is selected by the change switch 603 in the first temperature-controlling unit 60a, and the desired temperature T1 during coarse adjustment is selected by the change switch 613 in the second temperature-controlling unit 60b.

In step S1, the first and the second temperature-controlling units 60a and 60b are urged to supply the driving current to the heating coils 16 and 86 for raising the temperature of the thick tube 15 and the heat conductive cylinder 83. In step S2, a determination is made as to whether or not the temperature T15 detected for the thick tube 15 by the temperature sensor 91 and the temperature T83 detected for the heat conductive cylinder 83 by the temperature sensor 92 reach the desired temperatures T3 and T1, respectively.

When both the temperature of the thick tube 15 and the heat conductive cylinder 83 reach the desired temperature, in step S3, the VCM driving unit 64 is energized for coarse adjustment of the spindle 8 in the z direction. In step S4, a determination is made as to whether or not the tip 10 reaches the sample surface based on the extent of bending of the tip 10. When it is determined that the tip 10 reaches the sample surface, in step S5, the VCM driving unit 64 suppresses electrification of the voice coil motor to stop downward movement of the tip 10. In other words, coarse adjustment is completed and measurement mode is started.

In measurement mode, in step S6, the change switch 603 of the first temperature-controlling unit is switched to the desired temperature (T4) for measurement and the change switch 613 of the second temperature-controlling unit 60b is switched to the desired temperature (T2) for measurement.

In step S7, a determination is made as to whether or not the temperature T83 of the heat conductive cylinder 83 has fallen to the desired temperature T2. When the temperature T83 of the heat conductive cylinder 83 has fallen to the desired temperature T2, the thick tube 15 becomes integrally formed with the inner tube 13. Then, in step S8, whether or not the temperature T15 of the thick tube 15 has reached the desired temperature T4 for measurement is determined. When the temperature T15 of the thick tube 15 reaches the desired temperature T4, measurement is carried out in step 9.

According to this embodiment, temperature drift in the z direction caused by integration of the thick tube 15 with the inner tube 13 through lowering the temperature of the heat conductive cylinder 83 is eliminated not by supplying the offset current to the voice coil motor, but by thermal expansion of the thick tube 15 and the inner tube 13. Thus, temperature drift caused by the offset current flowing continuously through the voice coil motor in the z direction can be completely prevented.

Figure 5:
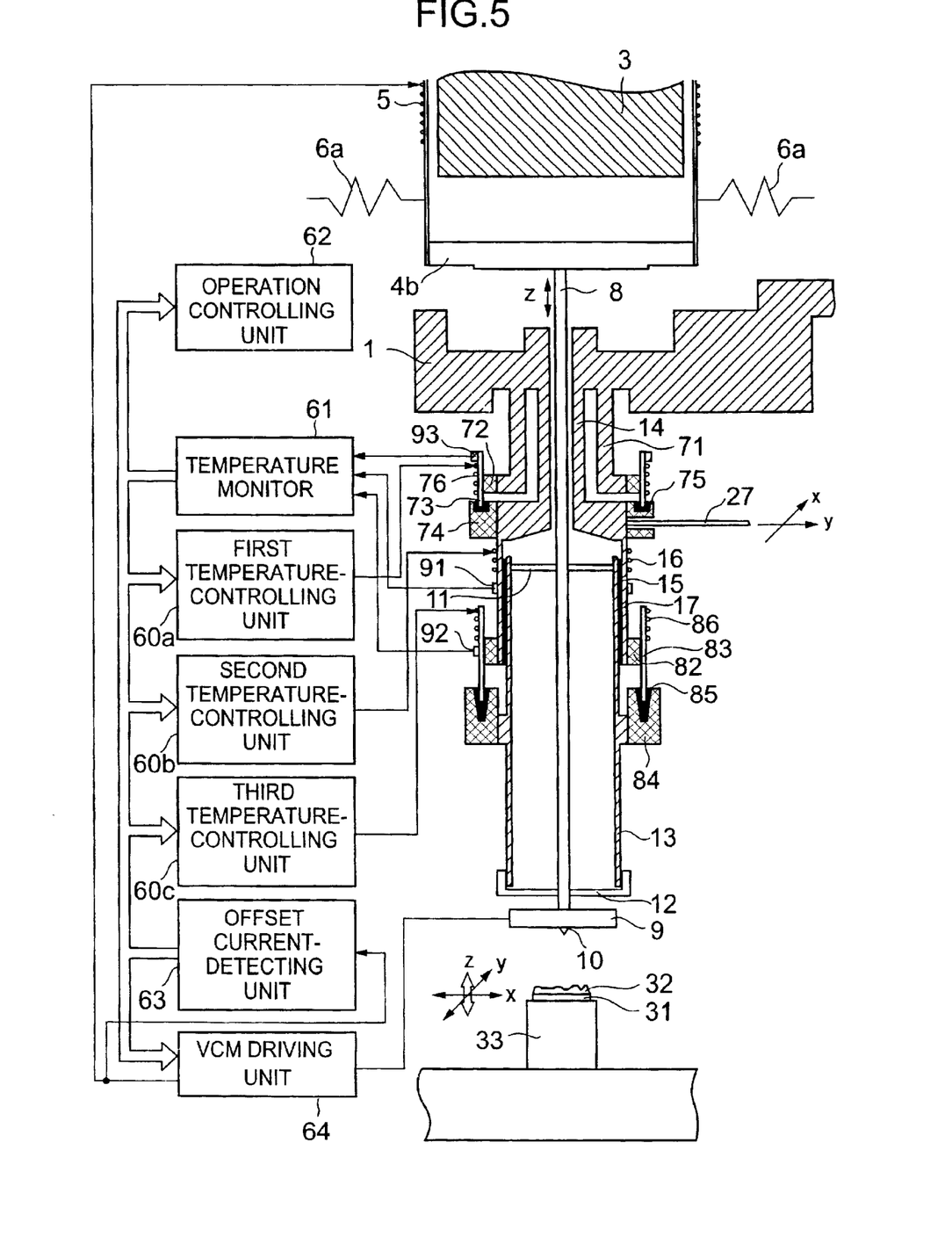
FIG. 5 shows a sectional view presenting a structure of a primary part of the probe scanning devices, which are the third and the fourth embodiments of the present invention.

FIG. 5 is a sectional view showing the structure of a main part of a third embodiment of the probe scanning device fabricated by applying the present invention, with the same numerals as above indicating the same or similar parts.

The present embodiment is characterized in that the offset current-detecting unit 63 for detecting the offset current, which is contained in the driving signal outputted from the VCM driving unit 64, is installed, the first temperature-controlling unit 60a raises the temperature of the thick tube 15 to a temperature at which viscosity of the viscous material decreases in coarse adjustment, and lowers the temperature to a temperature at which the offset current falls during measurement.

Figure 6:
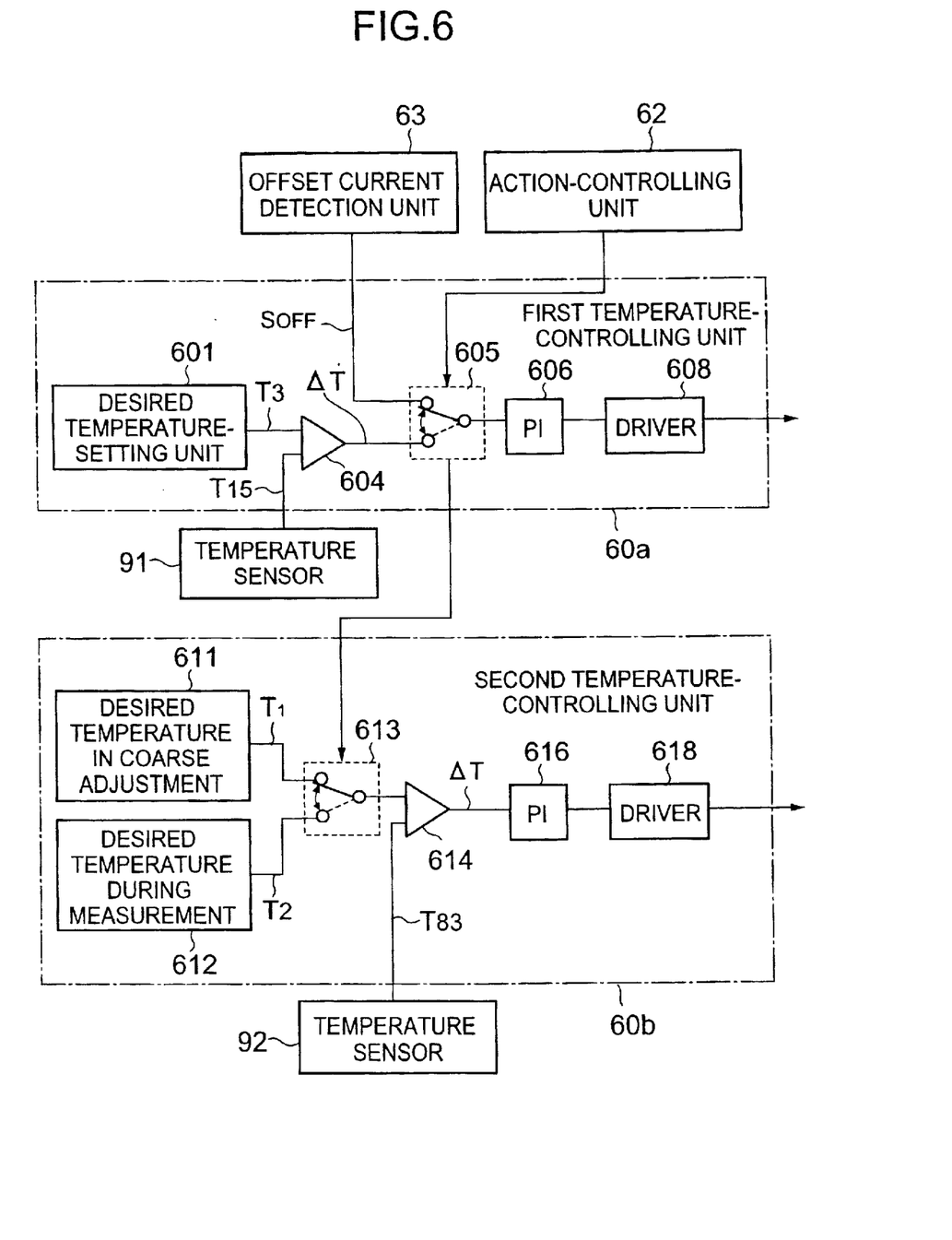
FIG. 6 is a block diagram showing the structure of the controlling system of the third embodiment.

FIG. 6 is a block view showing the structure of a main part of the first and the second temperature-controlling units 60a and 60b, with the same numerals as above indicating the same or similar parts.

At the desired temperature-setting unit 601 for coarse adjustment in the first temperature-controlling unit, a temperature allowing sufficient lowering of viscosity of the viscous material 17 is set as the desired temperature T3 of the thick tube 15 during coarse adjustment. A comparing unit 604 compares the desired temperature T3 during coarse adjustment T3 with a real temperature T5 of the thick tube 15, which is detected by the temperature sensor 91, to output a differential signal ΔT.

The change switch 605 outputs an offset signal Soff, which represents the offset current value detected by the offset current-detecting unit 63, or the differential signal ΔT to a PI-controlling unit 606. The output signal of the PI-controlling unit 606 is supplied to the heating coil 16 through a driver circuit 608.

In the desired temperature-setting unit 611 for coarse adjustment in the second temperature-controlling unit 60b, a temperature, higher than a melting point of the low melting-point metal 85 is set as the desired temperature T1 of the heat conductive cylinder 83 during coarse adjustment. At the desired temperature-setting unit 612 during measurement, a temperature, lower than a solidifying temperature of the low melting-point metal 85, is set as the desired temperature T2 of the heat conductive cylinder 83 during measurement.

The comparing unit 614 compares the desired temperature T1 or T2 selected by the change switch 613 with the real temperature T83 detected for the heat conductive cylinder 83 by the temperature sensor 92 to output its differential signal ΔT to the PI controlling unit 616. The output signal of the PI-controlling unit 616 is supplied to the heating coil 86 through the driver circuit 618.

Figure 7:
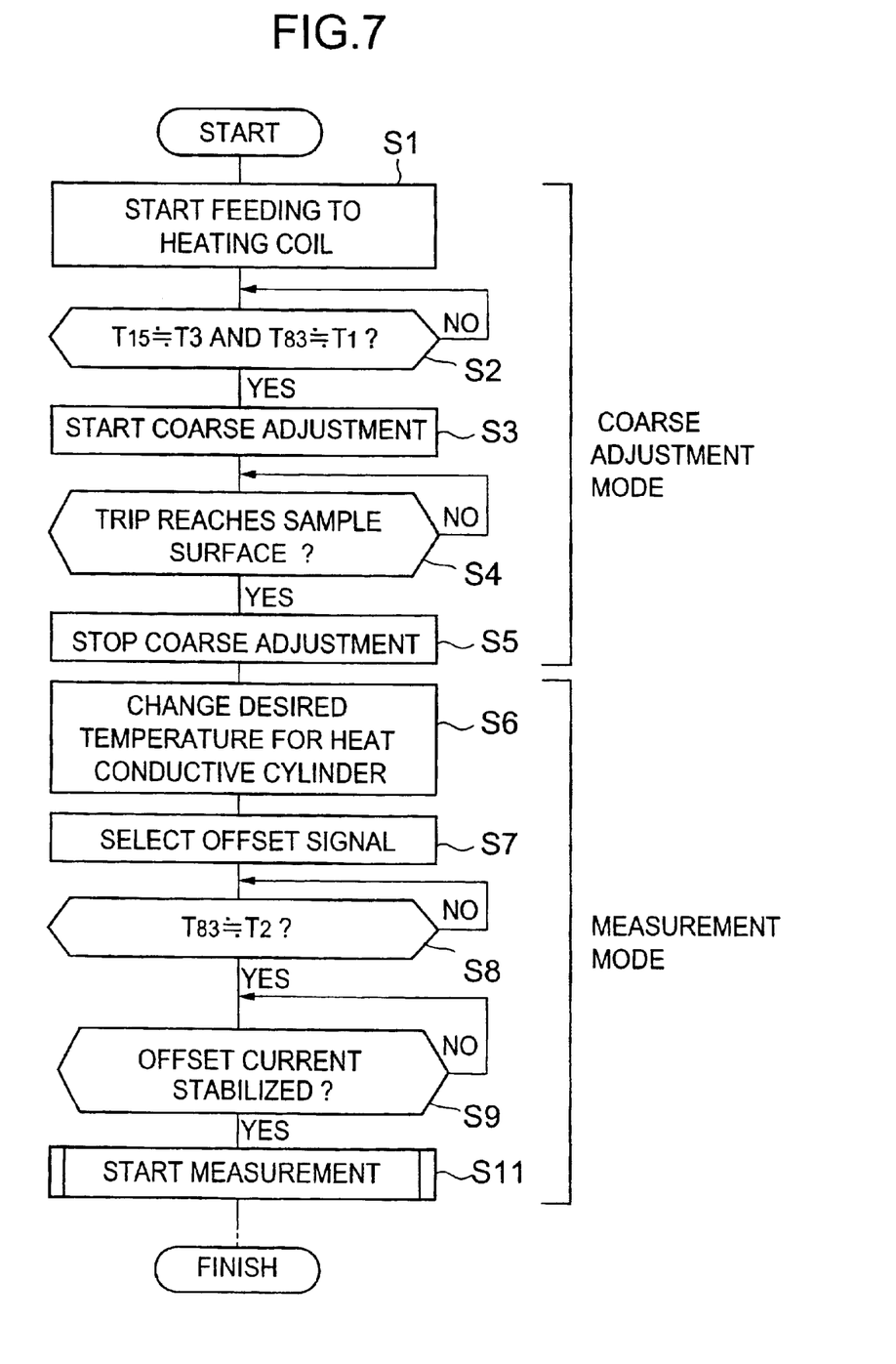
FIG. 7 is a flowchart showing the operation of the third embodiment.

On the other hand, the action of the present embodiment will be described in detail as follows with reference to a flow chart of FIG. 7.

The initial state is in the coarse adjustment mode and hence, it is defined that the comparator 604 is selected by the change switch 605 in the first temperature-controlling unit 60a and the desired temperature (T1) in coarse adjustment is selected by the change switch 613 in the second temperature-controlling unit 60b.

In step S1, the first temperature-controlling unit 60a and the second temperature-controlling unit 60b are urged to supply the driving current to the heating coils 16 and 86 for raising the temperature of the thick tube 15 and the heat conductive cylinder 83. In step S2, a determination is made as to whether or not the temperature T15 detected for the thick tube 15 by the temperature sensor 91 and the temperature T83 detected for the heat conductive cylinder 83 by the temperature sensor 92 reach the desired temperatures T3 and T1, respectively.

When both the temperature of the thick tube 15 and the heat conductive cylinder 83 reach the desired temperature, in step S3, the VCM driving unit 64 is energized for coarse adjustment of the spindle 8 in the z direction. In step S4, determination is made on whether or not the tip 10 reaches the sample surface based on the extent of bending of the tip 10. When it is determined that the tip 10 reaches the sample surface, in step S5, the VCM driving unit 64 suppresses electrification of the voice coil motor to stop downward movement of the tip 10. In otherwords, coarse adjustment is completed for starting the measurement mode.

In the measurement mode, in step S6, the change switch 613 of the second temperature-controlling unit 60b is switched to the side of the desired temperature T2 during measurement. In step S7, the change switch 605 of the first temperature-controlling unit 60a is switched to the offset signal Soff side. Instep S8, a determination is made as to whether or not the temperature T83 of the heat conductive cylinder 83 has fallen to the desired temperature. In step S9, a determination is made as to whether or not the offset signal Soff is stabilized in the action-controlling unit 62. When the offset signal Soff is determined to be stabilized, measurement is carried out in step S11.

According to the present embodiment, the temperature drift in the z direction, which is caused by the temperature change during measurement, can be eliminated not by supplying the offset current to the voice coil motor, but by thermal expansion or heat shrinkage of the thick tube 15 and the inner tube 13. Thus, the temperature drift due to heat generation and the change of ambient temperature, which are caused by the offset current flowing continuously through the voice coil motor in the z direction, can be completely prevented.

Figure 8:
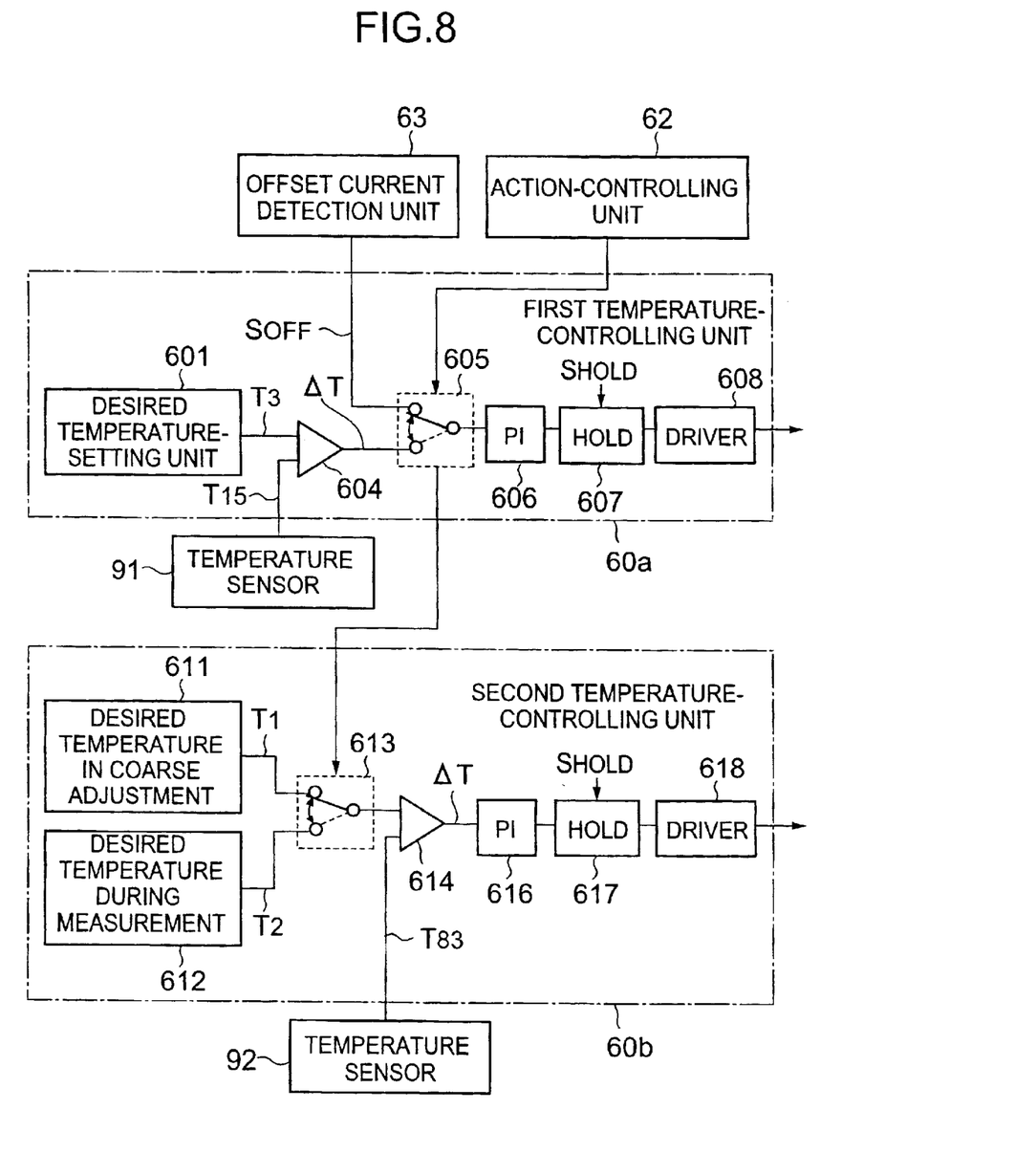
FIG. 8 is a block diagram showing the structure of the controlling system of the fourth embodiment.

FIG. 8 is a sectional view showing the structure of a primary part of a fourth embodiment of a probe scanning device fabricated by applying the present invention, with the same numerals as above indicating the same or similar portions. The present embodiment is characterized in that in the first and the second temperature-controlling units 60a and 60b, holding circuits 607 and 617 are added to individual later stages of the PI controlling unit 606 and 616, respectively.

Figure 9:
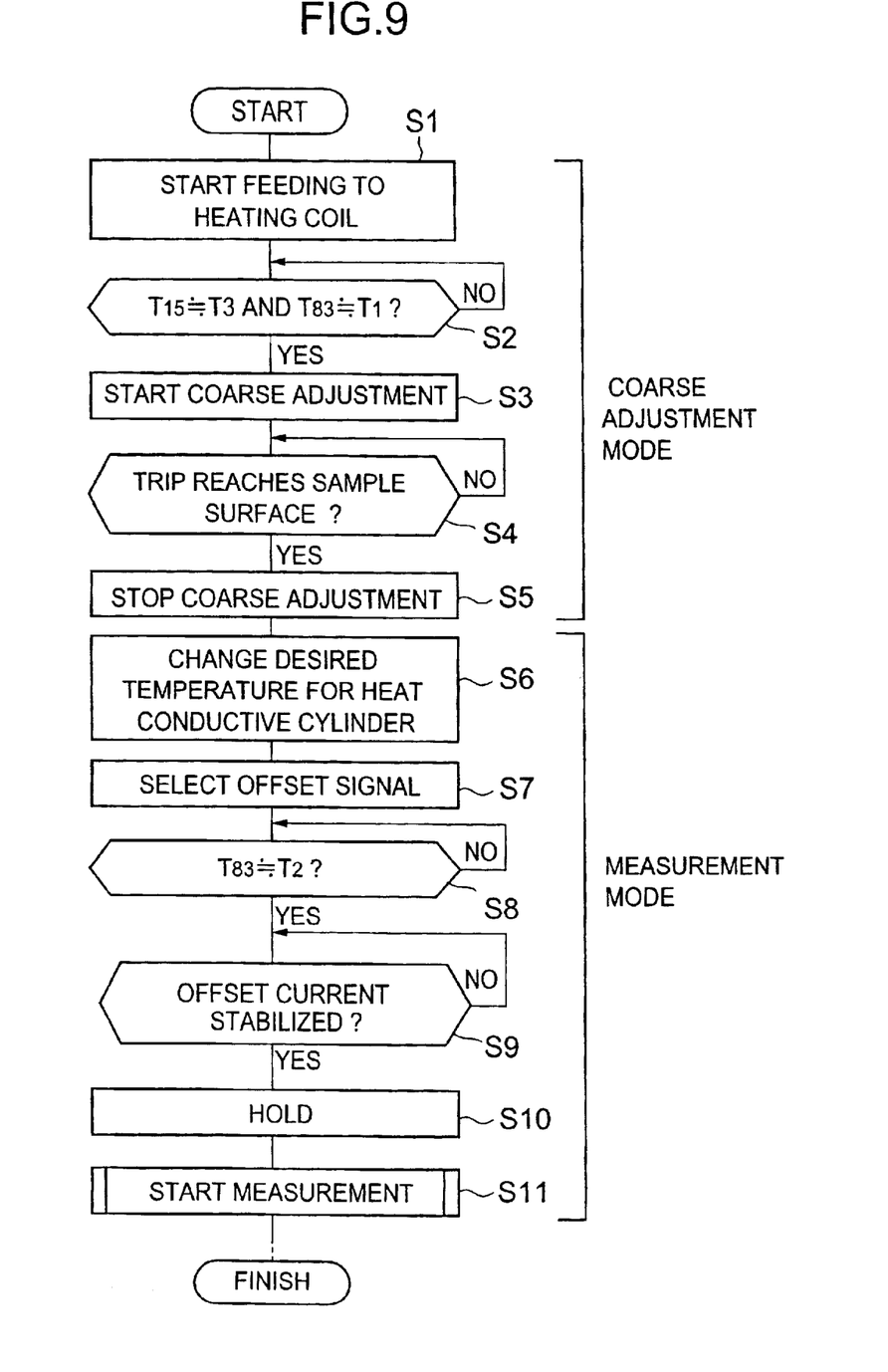
FIG. 9 is a flowchart showing the operation of the fourth embodiment.

FIG. 9 is a flowchart showing an operation of the present embodiment, and same processing as that of the third embodiment is carried out from step S1 to step S9.

In the present embodiment, when it is determined that the offset signal Soff is stabilized in step S9, a hold signal Shold is supplied to individual hold circuits 607 and 617 of the first and the second temperature-controlling units 60a and 60b instep S10. Individual hold circuits hold the input signal on the timing of the hold signal Shold.

In step S11, measurement is started.

According to the present embodiment, the output signals from the first and the second temperature-controlling units 60a and 60b are held during measurement to keep heat generated by individual heating coils constant and therefore, regardless of the change of the ambient temperature and the temperature drift in the controlling system, an image with a less noise can be obtained.

According to the present invention, the following effects can be achieved.

(1) In the probe scanning device in which the thick tube is selectively integrated with the inner tube according to an operation mode, integration of the thick tube with the inner tube is achieved by solidifying the low melting-point metal and shifting of the position of the thick tube from the inner tube over time can be prevented. Therefore, even in the case where the scanning speed in the xy direction is low so as to require a long time for measurement, high precision measurement becomes possible.

(2) During measurement, electrification of individual heating coils is controlled to keep the temperature of individual parts to a predetermined temperature and high precision measurement not influenced by temperature drift therefore becomes possible.

(3) The configuration is provided using a material such as super-invar with a very small thermal expansion coefficient and hence, influence of temperature drift can be further reduced.

(4) When the temperature of the heat conductive cylinder is decreased to the temperature at which the low melting-point metal solidifies, heat shrinkage of the heat conductive cylinder in the z direction is cancelled by thermal expansion of the thick tube and the inner tube and no offset current flows in the voice coil motor in the z direction. Temperature drift caused by flow of the offset current in the voice coil motor can therefore be prevented.

(5) Temperature drift in the z direction, which is caused by temperature change during measurement, can be eliminated not by supplying the offset current to the voice coil motor, but by thermal expansion or heat shrinkage of the thick tube 15 and the inner tube 13. Temperature drift caused by a continuous flow of offset current through the voice coil motor in the z direction can therefore be completely prevented.

(6) The output signals from the first and the second temperature-controlling units are held during measurement and an image with less noise can therefore be obtained regardless of the change of the ambient temperature and temperature drift in the controlling system.

What is claimed is:

1. A probe scanning device comprising:

a case;

a first tubular member extending in a z direction and having an end thereof supported by the case;

a second tubular member having a rear end portion extending into the first tubular member to define a space between an inner peripheral surface portion of the first tubular member and an outer peripheral surface portion of the second tubular member;

a probe tip mounted on a front end portion of the second tubular member;

a viscous material disposed in the space between the first tubular member and the second tubular member;

first heating means for heating the first tubular member;

scanning means for reciprocally scanning the first tubular member in an xy direction;

a voice coil motor for driving the second tubular member towards the first tubular member in the z direction;

first temperature-controlling means for controlling the first heating means to heat the first tubular member to decrease the viscosity of the viscous material;

driving means having a coarse adjustment mode for coarsely moving the probe tip toward a surface of a sample and a measurement mode for fine movement of the probe tip in the z direction to maintain a given relationship between relative positions of the probe tip and the sample surface after coarse movement; and connecting means for selectively integrally connecting the first tubular member and the second tubular member to one another.

2. A probe scanning device according to claim 1; wherein the connecting means comprises a low melting-point holder integrally connected to the second tubular member, the low melting-point holder being made of an insulating material and having a recess, a low melting-point metal disposed in the recess of the low melting-point holder, and a heat conductive member integrally connected to the first tubular member through an insulating member, the heat conductive member having an end embedded in the low melting-point metal; and further comprising second heating means for heating the heat conductive member, and second temperature-controlling means for controlling a supply of drive current to the second heating means to raise a temperature of the heat conductive member to a first temperature at which the low melting-point metal softens for coarse adjustment of the probe tip and to lower the temperature of the heat conductive member to a second temperature at which the low melting-point metal hardens for obtaining a probe.

3. A probe scanning device according to claim 1; wherein the first temperature-controlling means includes means for controlling the first heating means to heat the first tubular member to a first temperature at which the viscosity of the viscous material decreases for coarse adjustment of the probe tip and to heat the first tubular member to a second temperature different from the first temperature and at which the viscosity of the viscous material increases for obtaining a probe measurement.

4. A probe scanning device according to claim 2; wherein the first temperature-controlling means includes means for controlling the first heating means to heat the first tubular member to a third temperature at which the viscosity of the viscous material decreases for coarse adjustment of the probe tip and to heat the first tubular member to a fourth temperature different from the third temperature and at which the viscosity of the viscous material increases for obtaining a probe measurement.

5. A probe scanning device according to claim 4; wherein the fourth temperature is selected so that substantial heat shrinkage of the heat conductive member in the z direction occurring when the temperature of the heat conductive member falls from the first temperature to the second temperature is cancelled by substantial thermal expansion of the first tubular member and the second tubular member in the z direction occurring when the temperature of the first tubular member is raised from the third temperature to the fourth temperature.

6. A probe scanning device according to claim 1; further comprising an offset current detector for detecting an offset current contained in a driving current of the voice coil motor; wherein the first temperature-controlling means controls a driving current supplied to the first heating means to raise a temperature of the first tubular member to a temperature at which the viscosity of the viscous material decreases for adjustment and to lower the temperature of the first tubular member to a temperature at which the offset current detected by the offset current detector decreases to obtain a probe measurement.

7. A probe scanning device according to claim 2; further comprising an offset current detector for detecting an offset current contained in a driving current of the voice coil motor; wherein the first temperature-controlling means controls a driving current supplied to the first heating means to raise a temperature of the first tubular member to a temperature at which the viscosity of the viscous material decreases for coarse adjustment and to lower the temperature of the first tubular member to a temperature at which the offset current detected by the offset current detector decreases to obtain a probe measurement.

8. A probe scanning device according to claim 6; wherein the first temperature-controlling means comprises holding means for holding a driving current supplied to the first heating means to obtain the probe measurement.

9. A probe scanning device according to claim 7; wherein the second temperature-controlling means comprises a holding means for holding a driving current supplied to the second heating means to obtain the probe measurement.

10. A probe scanning device according to claim 8; wherein the holding means holds the driving current when the offset current falls below a predetermined value.

11. A probe scanning device according to claim 9; wherein the holding means holds the driving current when the offset current falls below a predetermined value.

12. A probe scanning device according to claim 1; further comprising a zooming mechanism for selectively integrally connecting the first tubular member to the case.

13. A probe scanning device comprising:

a case;

a first tubular member extending in a z direction and having an end thereof supported by the case;

a second tubular member having a rear end portion extending into the first tubular member to define a space between an inner peripheral surface portion of the first tubular member and an outer peripheral surface portion of the second tubular member;

a probe tip mounted on a front end portion of the second tubular member;

a viscous material disposed in the space between the first tubular member and the second tubular member;

a low melting-point holder integrally connected to the second tubular member, the low melting-point holder being formed of an insulating material and having a recess;

a low melting-point metal disposed in the recess of the low melting-point holder;

a heat conductive member integrally connected to the first tubular member through an insulating member, the heat conductive member having an end embedded in the low melting-point metal;

a first heater for heating the first tubular member;

a moving mechanism for reciprocally moving the first tubular member in an xy direction;

a voice coil motor for driving the second tubular member towards the first tubular member in the z direction;

a first temperature-controller for controlling the first heater to heat the first tubular member to decrease the viscosity of the viscous material; and a drive mechanism having a coarse adjustment mode for coarsely moving the probe tip toward a surface of a sample and a measurement mode for fine movement of the probe tip in the z direction to maintain a given relationship between relative positions of the probe tip and the sample surface after coarse movement.

14. A probe scanning device according to claim 13; wherein the first temperature-controller controls the first heater to heat the first tubular member to a first temperature at which the viscosity of the viscous material decreases for coarse adjustment of the probe tip and to heat the first tubular member to a second temperature different from the first temperature and at which the viscosity of the viscous material increases for obtaining a probe measurement.

15. A probe scanning device according to claim 13; further comprising a second heater for heating the heat conductive member, and a second temperature-controller for controlling a supply of drive current to the second heater to raise a temperature of the heat conductive member to a first temperature at which the low melting-point metal softens for coarse adjustment of the probe tip and to lower the temperature of the heat conductive member to a second temperature at which the low melting-point metal hardens for obtaining a probe measurement.

16. A probe scanning device according to claim 15; wherein the first temperature-controller controls the first heater to heat the first tubular member to a third temperature at which the viscosity of the viscous material decreases for coarse adjustment of the probe tip and to heat the first tubular member to a fourth temperature different from the third temperature and at which the viscosity of the viscous material increases for obtaining a probe measurement.

17. A probe scanning device according to claim 16; wherein the fourth temperature is selected so that substantial heat shrinkage of the heat conductive member in the z direction occurring when the temperature of the heat conductive member falls from the first temperature to the second temperature is cancelled by substantial thermal expansion of the first tubular member and the second tubular member in the z direction occurring when the temperature of the first tubular member is raised from the third temperature to the fourth temperature.

18. A probe scanning device according to claim 15; wherein the second temperature-controller comprises a holding circuit for holding a driving signal supplied to the second heater to obtain the probe measurement.

19. A probe scanning device according to claim 13; further comprising an offset current detector for detecting an offset current contained in a driving current of the voice coil motor; wherein the first temperature-controller controls a driving current supplied to the first heater to raise a temperature of the first tubular member to a temperature at which the viscosity of the viscous material decreases for coarse adjustment and to lower the temperature of the first tubular member to a temperature at which the offset current detected by the offset current detector decreases to obtain a probe measurement.

20. A probe scanning device according to claim 19; wherein the first temperature-controller comprises a holding circuit for holding a driving current supplied to the first heater to obtain the probe measurement.

21. A probe scanning device according to claim 20; wherein the holding circuit holds the driving current when the offset current falls below a predetermined value.

22. A probe scanning device comprising:

a first tubular member extending in a z direction;

a second tubular member having a first end portion and a second end portion, the first end portion extending into the first tubular member to define a space between an inner peripheral surface portion of the first tubular member and an outer peripheral surface portion of the second tubular member;

a probe tip mounted on the second end portion of the second tubular member;

a viscous material disposed in the space between the first tubular member and the second tubular member;

a heater for heating the first tubular member;

a first temperature-controller for controlling the first heater to heat the first tubular member to decrease the viscosity of the viscous material;

a drive mechanism having a coarse adjustment mode for coarsely moving the probe tip toward a surface of a sample and a measurement mode for fine movement of the probe tip in the z direction; and connecting means for selectively integrally connecting the first tubular member and the second tubular member to one another.

23. A probe scanning device according to claim 22; further comprising a moving mechanism for reciprocally moving the first tubular member in an xy direction; and a voice coil motor for driving the second tubular member towards the first tubular member in the z direction.

24. A probe scanning device according to claim 22; wherein the connecting means comprises a low melting-point holder integrally connected to the second tubular member and having a recess, a low melting-point metal disposed in the recess of the low melting-point holder, and a heat conductive member integrally connected to the first tubular member, the heat conductive member having an end embedded in the low melting-point metal.

25. A probe scanning device according to claim 24; wherein the low melting-point holder is formed of an insulating material.

26. A probe scanning device according to claim 24; wherein the heat conductive member is integrally connected to the first tubular member through an insulating member.

* * * * *